United States Patent [19]
Cretzler

[11] Patent Number: 5,644,724
[45] Date of Patent: Jul. 1, 1997

[54] POINT-OF-SALE TAX COLLECTION SYSTEM AND METHOD OF USING SAME

[76] Inventor: Donald J. Cretzler, 3712 Del Mar Ave., San Diego, Calif. 92106

[21] Appl. No.: 314,249

[22] Filed: Sep. 28, 1994

[51] Int. Cl.$^6$ .................................................. G06F 17/60
[52] U.S. Cl. .......................... 395/219; 395/231; 395/242; 235/379; 902/22; 902/24
[58] Field of Search ........................... 364/401 R, 408, 364/409, 405; 235/379, 380; 395/219, 231, 242; 902/22, 24

[56] References Cited

U.S. PATENT DOCUMENTS

| | | | |
|---|---|---|---|
| 3,946,217 | 3/1976 | Tsujikawa et al. | 364/405 |
| 3,946,220 | 3/1976 | Brobeck et al. | 364/405 |
| 5,138,549 | 8/1992 | Bern | 364/408 |
| 5,220,501 | 6/1993 | Lawlor et al. | 364/408 |
| 5,335,169 | 8/1994 | Chong | 364/408 |
| 5,396,417 | 3/1995 | Burks et al. | 364/401 |
| 5,420,405 | 5/1995 | Chasek | 235/379 |

OTHER PUBLICATIONS

"Paper–Free Tax Returns . . . at the Touch of Your Telephone (Washington Report)" *The Office* vol. 118, No. 1, p. 22(1), Jul., 1993 (3 pages).

Leonard Wiener: "Is the IRS Prepared for Your Tax Return", *U.S. News & World Report*, vol. 100, p. 51(2), Mar. 31, 1986 (3 pages).

*Primary Examiner*—Robert A. Weinhardt
*Assistant Examiner*—Joseph Thomas
*Attorney, Agent, or Firm*—Bernard L. Kleinke; Peter P. Scott

[57] ABSTRACT

A new and improved tax collection system and method collects and remits taxes in real time at point-of-sale locations. The system includes a group of point-of-sale terminals at merchant point-of-sale facilities that receive and store tax collection information under merchant control. A bank computer at a merchant bank accesses the stored tax collection information and wire transfers the collected sums periodically to at least one computer at a tax authority bank. For credit or debit transactions, a service computer receives the tax collection information daily from certain ones of the point-of-sale terminals, and wire transfers the credited or debited taxes to the tax authority bank computer.

13 Claims, 5 Drawing Sheets

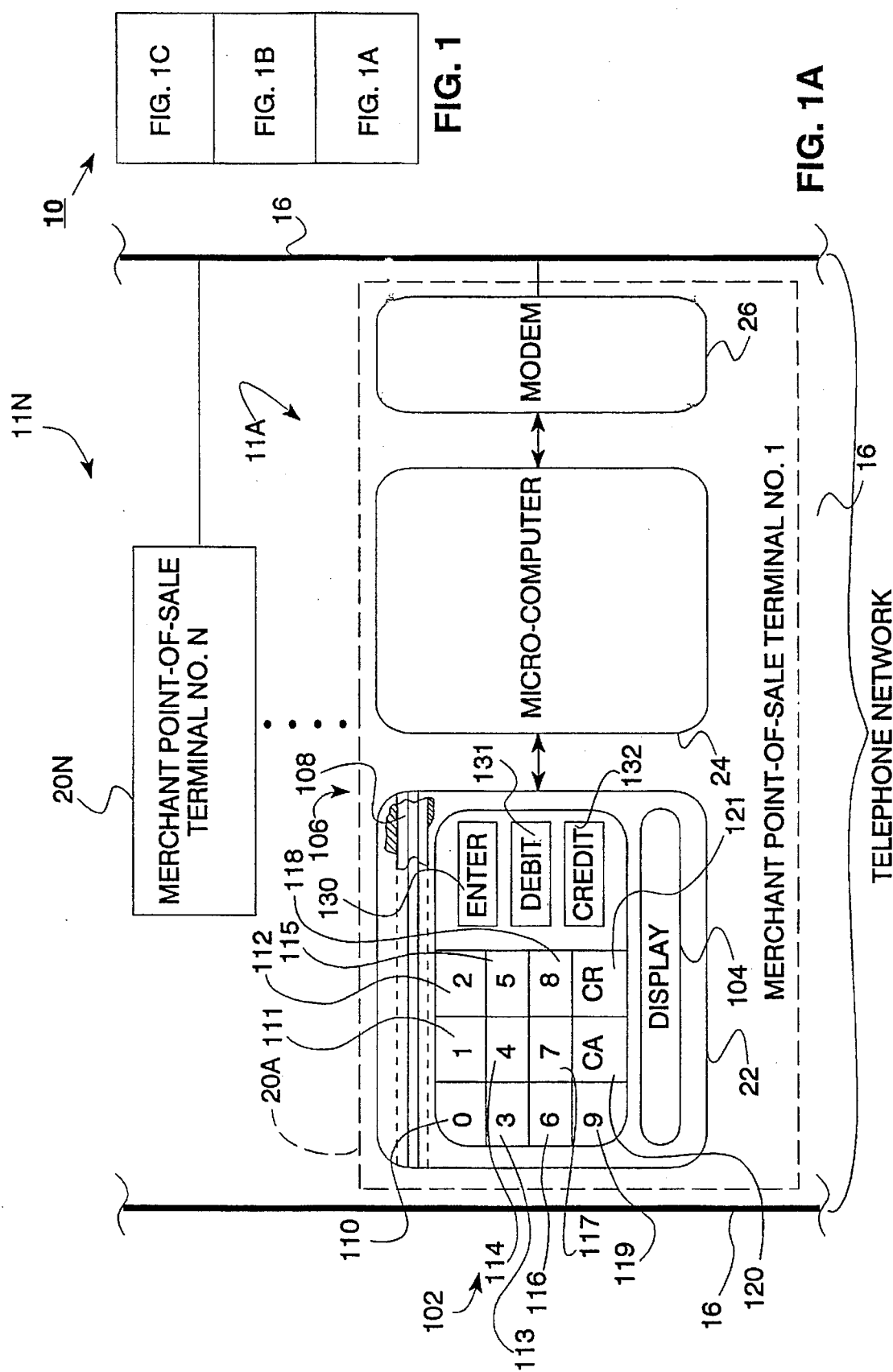

MERCHANT/CUSTOMER TRANSACTIONS

BANK TRANSACTION

POINT-OF-SALE TAX COLLECTION SYSTEM AND METHOD OF USING SAME

TECHNICAL FIELD

The present invention relates in general to data processing systems and the methods of their use. The invention more particularly relates to a computerized point-of-sale tax collection system which may be used to facilitate the collection of sales tax at point-of-sale facilities.

BACKGROUND ART

The collection of sales and use taxes is a business requirement of retailers and merchants throughout the United States. In this regard, taxing authorities at the local, state and federal levels require both large and small businesses to collect a sales tax for each item of goods they sell in the course of commerce.

To meet taxing authority requirements, a typical merchant must calculate the sales tax for each customer transaction, add the calculated sum to the invoice or bill presented to the customer for the goods sold, collect the sales tax from the customer with the purchase sum, deposit for safe keeping the collected taxes and finally remit and account for the collected taxes to the appropriate taxing authorities on a periodic basis, which is typically on a quarterly basis.

To compensate the merchant or retailer for the burden of acting as the agent for the taxing authority, the merchant is allowed to keep the periodic interest accrued on the collected tax dollars during each collection period.

While the above described method of collecting and remitting sales and use taxes has been effectively employed for many years, such a method is not cost effective and costs the taxing authorities billions of dollars each year. In this regard, the taxing authority not only loses the accrued periodic interest known as "the float," but the authority also loses the use of the collected money until it is remitted by the merchants for the collection period. Moreover, since the taxing authority does not have the use of the collected money until it is remitted, the money is not available for use to pay the monetary obligations of the taxing authority. Thus, the taxing authority may be compelled to borrow money to meet its financial obligations.

Another problem with not having the collected funds for immediate use by the taxing authority is that higher prices or interest on goods and services, required by the taxing authority, may be imposed by those providing such goods and services. In this regard, while some providers may be willing to wait for payment, others may not. Thus, certain vendors may not be willing to deal with a taxing authority because of delays in being paid. Other vendors may raise the price of their goods and services, and still others may impose late charges or interest. Such additional charges add to the cost of doing business and thus, makes such governmental agencies less cost effective. Moreover, such increased cost must be paid by the general public as such additional expenses can only be paid by increasing taxes.

Therefore, it would be highly desirable to have a new and improved method and system for collecting sales taxes that would make taxing authorities more cost effective and thus, by helping government, would benefit the public.

One proposed solution to the above-mentioned problem is to require merchants to remit the collected taxes on a more frequent basis; for example, on a weekly, semi-monthly or monthly basis. However, legislatures have been steadfast, requiring collected taxes to be paid quarterly. More particularly, legislatures want to balance the rights of the merchants against the imposed duty of collecting taxes on behalf of governmental agencies. In this regard, legislatures have declared remitting taxes four times a year is not overly burdensome. Periods more frequent than four times a year however are considered not only an imposition, but also overly burdensome.

Therefore, it would be highly desirable to have a new and improved method and system for collecting sales taxes that would allow collected funds to become available to government more quickly, while at the same time, not causing a greater imposition on the merchants than imposed by the present tax collection methods.

DISCLOSURE OF INVENTION

Therefore, the principal object of the present invention is to provide a new and improved sales tax collection system and method of using it that makes collected funds available more quickly to taxing authorities without imposing any greater burden on the merchant collecting agents.

Briefly, the above and further objects of the present invention are realized by providing a new and improved sales and use tax collection system and method of using it to collect and remit taxes in real time at point-of-sale locations.

The tax collection system includes a group of point-of-sale terminals which are installed at merchant point-of-sale facilities. The terminals identify each merchant by the merchant's assigned tax identification number, receive and store sales tax collection information from the daily transactions of the identified merchant, and totals the daily sum of collected taxes by the merchant who is required to remit such taxes to the appropriate taxing authority. For cash transactions, a bank computer at a merchant bank receives the tax collection information from the merchant, and in response thereto, wire transfers the collected sums either when deposited by the merchant or after a predetermined period of time following receipt of the tax information. For credit or debit transactions, a service computer at the bank of the customer receives the tax collection information from the merchant, and in response thereto, wire transfers the credited or debited taxes after a predetermined period of time following receipt of the tax information. A tax authority bank receives and processes the funds for each bank computer and each service computer. In this manner, the sales and use tax funds collected by the numerous merchants can be transferred to the government taxing authorities quickly and efficiently, thereby realizing an economic advantage to the taxing authority, reducing the burden imposed on the merchant and helping the general public by making government more cost effective.

Thus, the system and method of the present invention encourages merchants responsible for collecting and remitting sales and use taxes to enter information via the merchant terminal. Such merchant no longer must segregate funds or maintain separate accounts. Tax payment summaries are also made available to both merchants and customers. In short, the system and method of using it benefits all concerned.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1A, 1B and 1C, when arranged as shown in FIG. 1, is a block diagram of the tax collection system according to the present invention.

BEST MODE FOR CARRYING OUT THE INVENTION

The following description is presented and organized according to the following outline:
- A. HARDWARE DESCRIPTION
- B. SYSTEM OPERATION
- C. SYSTEM COMPUTER SOFTWARE
- D. DETAIL DESCRIPTION

A. HARDWARE DESCRIPTION

Figure 1B:
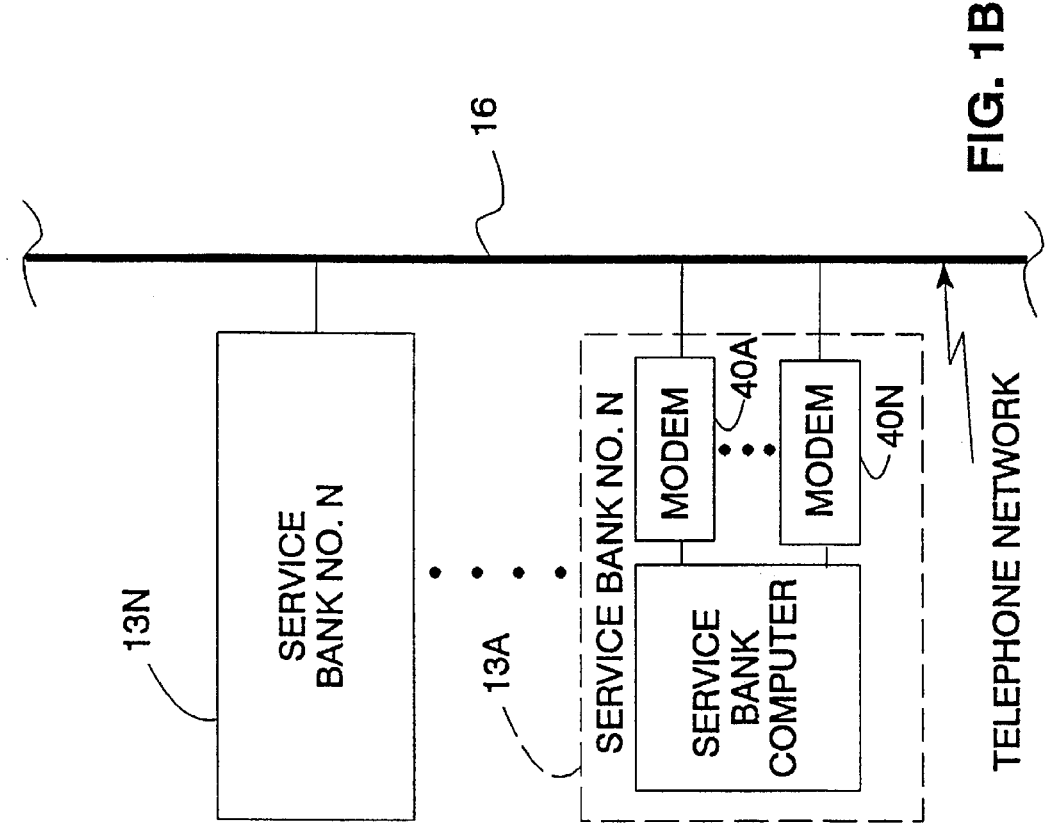
Figure 1B:
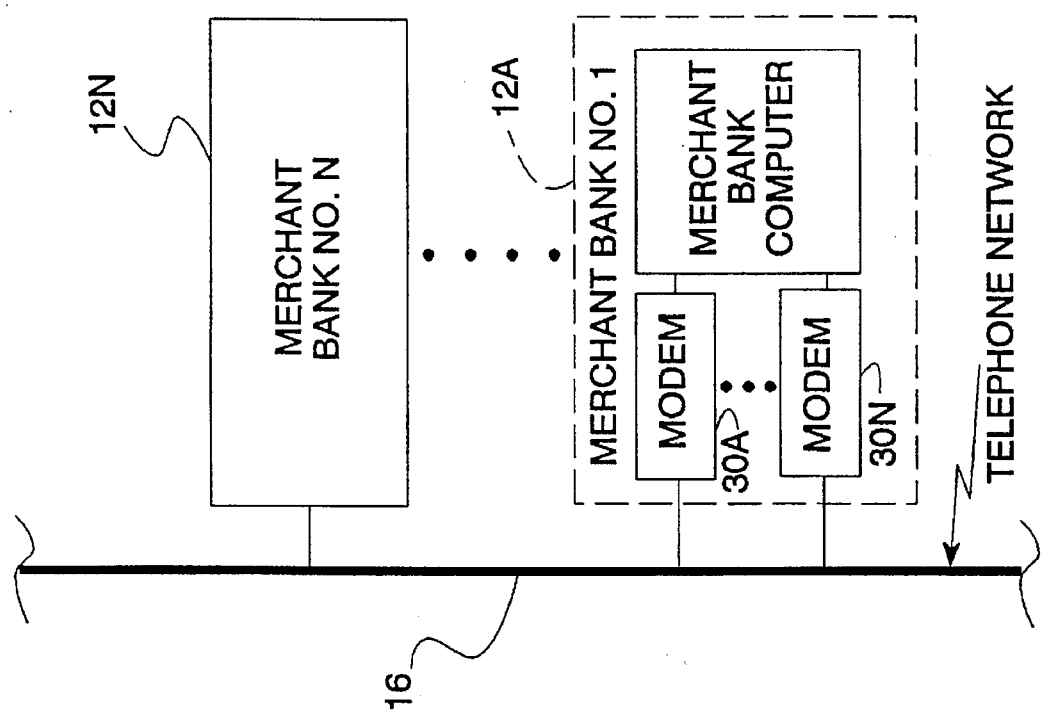

Referring now to FIG. 1 of the drawings, there is shown a computerized sales tax collection system 10, which is constructed in accordance with the present invention and which is adapted to transfer collected sales and use taxes selectively to a large group of taxing authorities 15A–15N.

FIG. 1 illustrates the present computerized sales tax collection system 10 for entering collected or allocated sales and use taxes at point-of-sale locations 11A–11N, for transmitting collected sales tax information to associated merchant banks 12A–12N for transmitting allocated sales tax information to associated customer service banks 13A–13N and for wire transferring the collected and allocated sales and use taxes from the merchant and service banks to individual and selected ones of taxing authority banks 14A–14N who, in turn, notify the corresponding taxing authorities 15A–15N of the sums received on behalf of various retailers and merchants. The method of communication between the point-of-sale locations 11A–11N and the various taxing authorities 15A–15N is a bidirectional communication system whereby merchants are identified by tax identification numbers and individual merchant tax collection and payment information is transferred to the taxing authorities 15A–15N via a telephone network 16 connecting the taxing authorities 15A–15N, their associated banks 14A–14N, and the respective merchant and service banks 12A–12N and 13A–13N interacting with the merchant. It should be understood that although the tax collection system disclosed herein utilizes the public switched telephone network available within the local community in which the particular merchants, banks and taxing authorities are located, other equivalent forms of communication may be utilized. Each point-of-sale location of the tax collection system 10 includes one or more point-of-sale or transaction terminals 20A–20N. The individual terminals, such as terminal 20A, transmit signals indicative of the collected or allocated taxes on a periodic bases, such as at the close of each business day, to individual and selected ones of the respective merchant and service banks 12A–12N and 13A–13N. The use of the public telephone network 16 provides the ability to identify the tax collecting merchants and the sums they have collected for individual and selected ones of the taxing authorities. Each terminal, such as the terminal 20A, includes an input device 22 for entering and displaying transaction information, and a microprocessor 24 which evaluates transaction information, determines what sales and use taxes should be collected or allocated to each transaction, and determine which taxing authorities should receive the collected and allocated taxes according to the operating software stored within the microcomputer 24. Each microcomputer communicates with an associated modem, such as microcomputer 24 communicates with a modem 26 which transmits selectively as will be described hereinafter in greater detail, tax collection and allocation data to other modems located at merchant and service banks, such as modems 30A–30N and 40A–40N respectively. Each respective merchant and service bank, in turn, communicates with individual and selected ones of a group of tax authority bank modems 50A to 50N, and 60A to 60N respectively to provide wire transfers of collected and allocated sums for each merchant collecting such sums on behalf of the taxing authority.

Figure 1C:
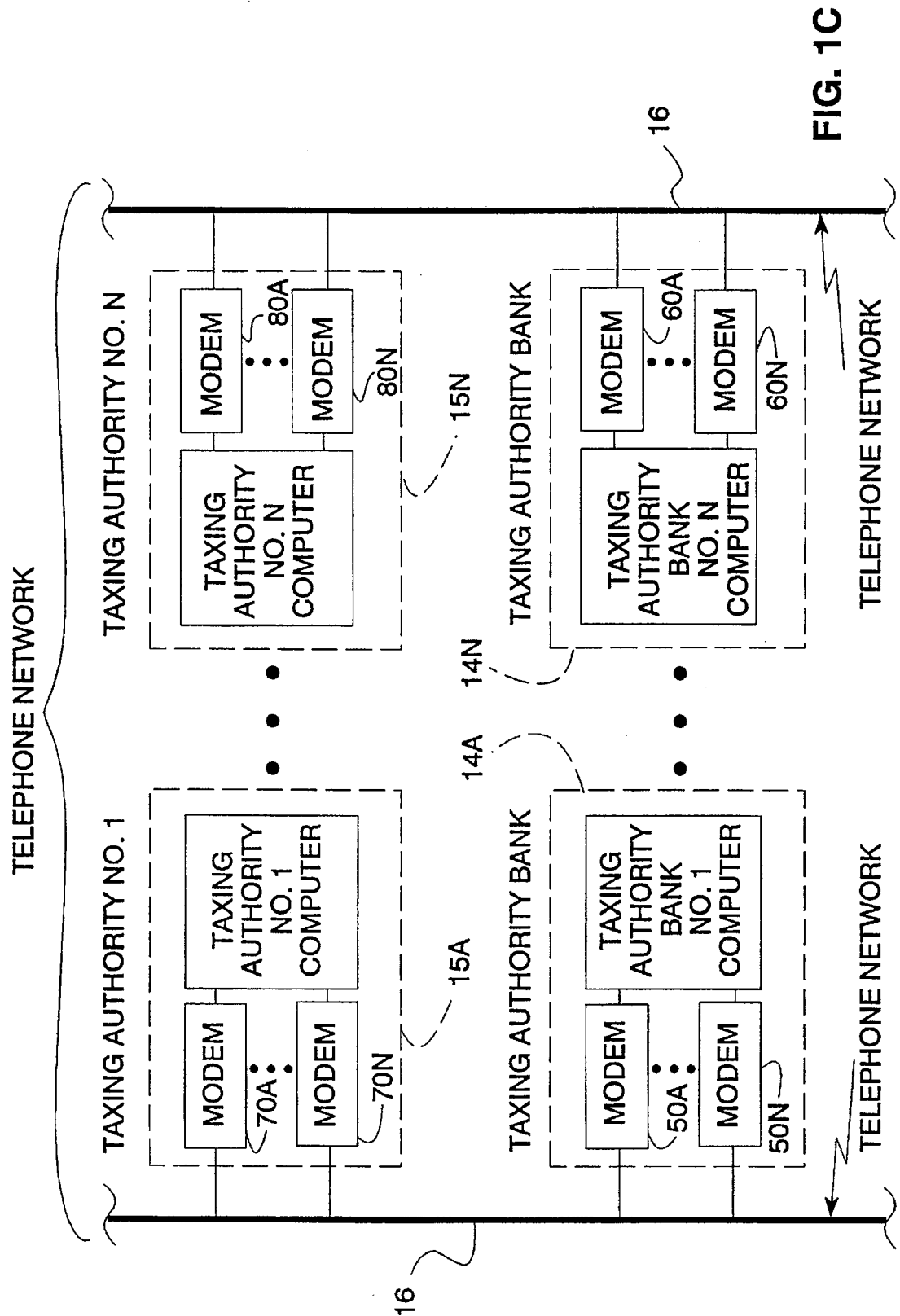

As best seen in FIG. 1C, the taxing authority banks 14A–14N then communicate with their respective taxing authority customers 15A–15N via the taxing authority modems 70A–70N and 80A–80N.

B. SYSTEM OPERATION

In operation, a merchant (not shown) utilizing the point-of-sale terminal, such as the terminal 20A enters sales transaction data into the microcomputer 24 via the input device 22. Such data includes the purchase price of the goods and services purchased by a customer (not shown), and whether the sales transaction is a cash/check transaction or a credit card/debit card transaction. If the transaction is a credit card/debit card transaction, the merchant also enters the credit card or debit card number.

In response to the transaction data, the microprocessor 24 computes the appropriate sales or use taxes and provides the merchant with an indication of the amount of taxes to be collected. The merchant then enters this data on the customer's invoice and then collects the total sum of the purchase price plus taxes from the customer. The microcomputer 24 in response to a transaction completed signal entered by the merchant via the input device 22, stores the transaction information including the amount of collected taxes. The microcomputer 24 also keeps a running total of all collected taxes for each individual one of the merchant banks 12A–12N and the taxing authorities 15A–15N.

For credit and debit transactions, the process is similar to cash transactions except the microprocessor 24 also communicates with the service bank of the customer prior to the completion of the transaction via the respective modems to obtain approval for the intended transaction. Upon approval via an authorization code signal, the microcomputer 24 provides the merchant with an indication of the authorization code. The merchant then enters the authorization code and tax information on a debit receipt providing a receipt or statement attesting to the purchase price and the additional sums allocated to taxes. The microprocessor 24 in response to the transaction completion signal stores the transaction information including the amount of authorization allocated taxes. The microprocessor also keeps a running total of all allocated taxes for each individual one of the service banks 12A–12N as well as the taxing authorities 15A–15N.

At the end of each business day, the merchant enters a transmit code into the microcomputer 24 via the input device 22 that causes the microcomputer 24 to send the following tax information to the bank of the merchant:

1. The date and tax identification number of the merchant;
2. The total sum of collected taxes for the transaction period;
3. The allocation of the total sum of collected taxes to the individual taxing authorities;
4. The date the merchant expects to deposit the collected tax in the merchant bank; and
5. An authorization code to instruct the merchant bank to wire transfer the collected sums to the appropriate taxing authorities.

Upon receipt of the transaction data, the corresponding merchant bank waits a predetermined period of time to allow the merchant to deposit the collected funds into the account of the merchant before wire transferring the sums to the taxing authority banks. Alternately, if the merchant has provided the bank with an authorization code and funds are already on deposit, the merchant bank will wire transfer the funds indicated the next business day. In this manner, the taxing authority will have the funds on deposit for use within one to three business days after they are collected at the point-of-sale location.

Those skilled in the art will understand that the tax information stored at a given point-of-sale terminal may also be accessed by the bank of the merchant on a periodic basis. Thus, it is contemplated within the scope of the present disclosure that transfer of tax information from the point-of-sale terminal can be initiated by either the bank of the merchant at the convenience of the bank or the merchant.

With respect to service banks, such as the service bank 13A, at the end of each business day, the merchant enters the transmit code to cause the microcomputer 24 to send the following information to individual and selected ones of the service banks:

1. The date and tax identification number of the merchant;
2. The date, customer name, account number; authorization number and transaction amount of each transaction to be processed by the service bank;
3. The total sum of allocated taxes associated with the customers of the service bank;
4. The allocation of the total taxes to the individual taxing authorities; and
5. An authorization code to instruct the service bank to wire transfer the allocated sums to the appropriate taxing authorities.

Upon receipt of the transaction data, the corresponding service bank waits a predetermined period of time to allow the merchant to return the debits receipts to the service bank for processing. Alternately, if the merchant has provided the bank with an authorization code and funds are already on deposit, the merchant bank will wire transfer the funds allocated the next business day.

Although the transfer of tax information to the service bank is initiated by the merchant it is contemplated within the scope of the present disclosure that transfers can be initiated by the service bank accessing the tax information stored at a point-of-sale terminal.

The system 10 generally comprises the large group of point-of-sale or transaction terminals 20A–20N which communicate individually and selectively with one or more merchant banks 12A–12N or one of more credit card or debit card service banks 13A–13N. The terminals 20A–20N are each disposed on a variety of widely distributed merchant locations, such as retail stores, restaurants, utility services, grocery stores, gasoline stations, and others. In this manner, for cash transactions, a merchant (not shown) can enter the sum of collected taxes at a point-of-sale location, notify the bank of the merchant of the sum collected and instruct the bank to wire transfer, from the account of the merchant, the collected taxes to individual and selected ones of the large number of taxing authority banks 14A–14N. Alternately, for credit and debit card transactions, the merchant can notify individual and selected ones of a large number of the credit card or debit card service banks 13A–13N of the amount of taxes associated with the creditor debit card transaction, and instruct the service bank to wire transfer from the account of the merchant those sums allocated to taxes from the customers of the service bank. The taxing authority banks 14A–14N, upon receipt of the collected taxes from the merchant banks 12A–12N or service banks 13A–13N, notify their corresponding tax authority customer 15A–15N of the sums received on behalf of each merchant.

C. SYSTEM COMPUTER SOFTWARE

Figure 2:
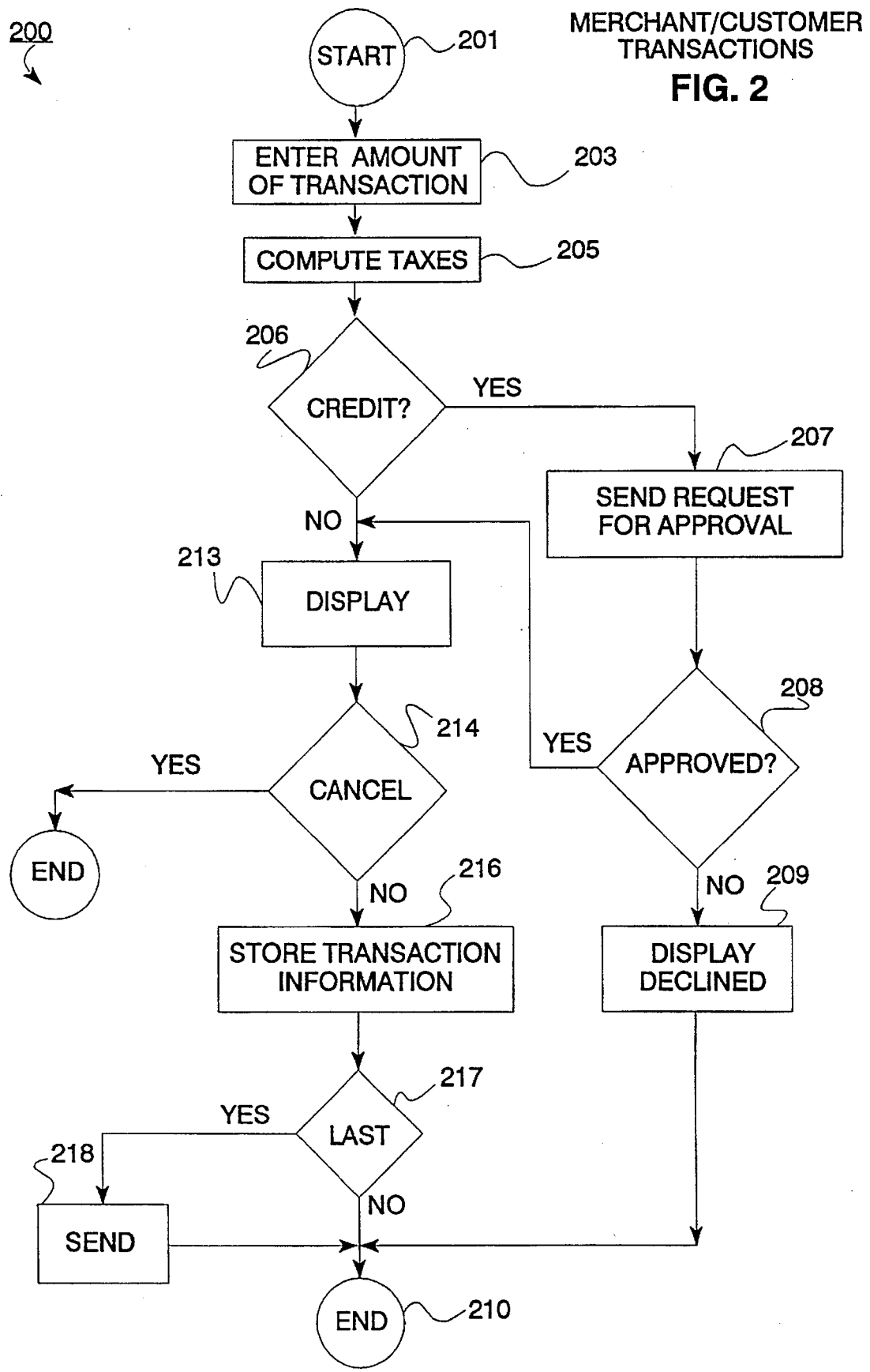
FIGS. 2 and 3 are flowchart diagrams illustrating the operating steps of the system of FIG. 1.

Considering now the operation of the system software in greater detail with reference to FIG. 2, a transaction program 200 flowchart is illustrated that starts at a START command 201 whenever the CASH key 120 or the CREDIT key 121 is depressed by a user. The program then advances to a command instruction 203 which causes a message "ENTER AMOUNT OF TRANSACTION" to be displayed by the display 104.

After the user enters the amount of transaction, command instruction 205 that computes the amount of taxes due to each taxing authority relative to the type of transaction.

After the taxes are computed, the program proceeds to a decision instruction 206 when the user depresses the ENTER key 130. At instruction 206 a determination is made whether the user initially depressed the CREDIT key 132.

If the user depressed the CREDIT key 132 the program advances to a command instruction 207 that causes a request for approval command to be sent to the appropriate service bank after the user enters the credit or debit card number of the customer by either using the card reader 108 or entering the card identification number via the keypad 102.

The system then waits for the approval of the transaction amount including the computed taxes at a decision instruction 208. If no approval is received within a predetermined period of time, the program goes to command instruction 209 which causes a message "DECLINED" to be displayed by the display 104. The program then ends at instruction 210 and waits for the next transaction.

If approval is received, the program advances to a command instruction 213 which causes the total amount of the transaction including the amount of taxes due to be displayed by the display 104. The user then enters the total amount of the transaction on customers invoice, including the amount of taxes due.

The user then presents the invoice to the customer for payment in cash or the return of signed debit/credit card receipt. The program advances to a decision instruction 214 to determine whether or not the transaction has been completed or cancelled.

If the transaction is not completed within a predetermined period of time, the program advances to an END command 215. If the transaction is completed, the program advances to a command instruction 216 as will be explained hereinafter.

After the user has received the cash for the transaction or a signed debit/credit card receipt, the user depresses the ENTER key 130.

When the ENTER key 130 is depressed, the program proceeds to the command instruction 216 which causes the amount of the transaction including the collected amount of taxes to be stored by the microcomputer 24. A message "LAST TRANSACTION" is also displayed by the display 104 to determine whether or not the user desires the stored to date transaction information to be sent to individual and selected ones of the merchant banks 12A–12N and service banks 13A–13N.

The program advances to a decision instruction 217 to determine if the user desires to transmit the stored transaction data.

If the user depresses the ENTER key 130, the program advances to a command instruction 218 that causes the stored transaction information to be sent by the microprocessor 24 via the modem 26 to the selected and individual ones of the merchant banks 12A–12N and service banks 13A–13N.

Once the stored information has been sent and receipt acknowledged by the banks, the program advances to the END command 210.

If the user does not depress the ENTER key 130 within a predetermined period of time after the message "LAST TRANSACTION" is displayed, the program proceeds to the END command 210.

Figure 3:
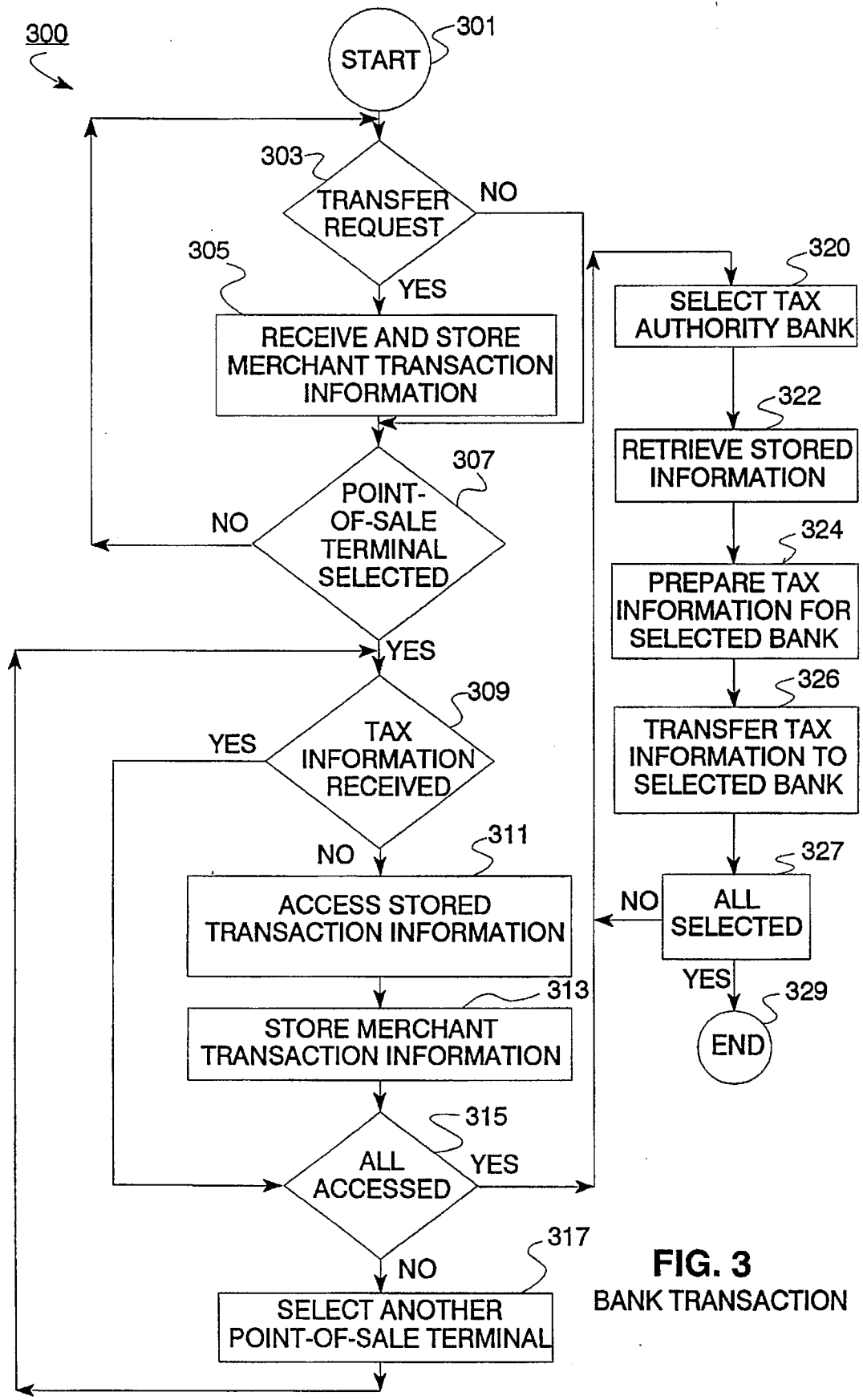

Considering the operation of the system software in still greater detail with reference to FIG. 3, each merchant bank computer includes an operations program 300 for accumulating tax information from selected ones of the point-of-sale terminals 20A–20N and for preparing such tax information for transfer to selected ones of the taxing authority banks 14A–14N.

As best seen in FIG. 3, the operation program 300 begins at a START command 301 at the beginning of each day. The program then proceeds to a decision instruction 303 to determine whether any one of the point-of-sale terminals 20A–20N is requesting to transfer its accumulated transaction information.

If a point-of-sale terminal, such as the terminal 20A is requesting to transfer such information, the program advances to a command instruction 305 to receive and store the merchant transaction information described previously. The program then proceeds to a decision instruction 307 to determine whether the bank desires to access a selected one of the merchant point-of-sale terminals for transfer of its stored tax information to selected ones of the taxing authority banks 14A–14N. If no transfer request has been received at decision instruction 303, the program advances directly to the decision instruction 307.

At decision instruction 307, if it is determined that the bank does not desire to transfer the then accumulated tax information, the program returns to the decision instruction 303 and proceeds as described previously.

If the bank desires to transfer the accumulated tax information, the program advances to a decision instruction 309 to determine whether the selected point-of-sale terminal has already transferred its accumulated tax information. If the tax information has already been received at the initiation of the merchant, the program proceeds to a decision instruction 315 to determine whether all the point-of-sale terminals serviced by the merchant bank have transferred their accumulated tax information.

The system proceeds from instruction 309 to a command instruction 311 to access the stored tax information at the selected point-of-sale terminal, such as the terminal 20A, if the accumulated information has not already been received. The accessed information is stored as the program proceeds to a command instruction 313.

After the accessed information is stored, the program advances to the decision instruction 315. In this regard, at instruction 315, if it is determined that not all of the terminals have been accessed, the program advances to a command instruction 317 to select another terminal, such as the terminal 20N. From instruction 317, the program returns to decision instruction 309 and proceeds as described previously.

At decision instruction 315, if it is determined that all terminals have transferred their accumulated tax information, the program advances to a command instruction 320. Command instruction 320 causes one of the tax authority banks to be selected.

Next, the program goes to a command instruction 322 to retrieve the tax information that must be transferred to the selected bank, such as the bank 14A. The program then proceeds to a command instruction 324 which causes the tax information for the selected bank to be prepared. Such tax information includes a wire transfer of all the sums collected from the merchants and a summary report indicating the allocation of those sums between the merchants who would collect the taxes.

After the tax information for the selected taxing authority bank has been prepared, the program advances to a command instruction 326 causing the information to be transferred to the selected tax authority bank.

Next, the program goes to a decision instruction 327 to determine when all of the taxing authority banks have been selected. If they have not all been selected, the program returns to the command instruction 320 and proceeds as previously described. If all of the taxing authority banks 14A–14N have been selected, the program goes to an END command 329.

From the foregoing, it will be understood by those skilled in the art, that transfer of collected taxes can occur on each bank business day. In this manner, the sales and use taxes collected by the various merchants can be transferred to the government taxing authorities quickly and efficiently.

D. DETAIL DESCRIPTION

Considering now the terminals 20A–20N as each terminal is substantially identical only terminal 20A will be described in greater detail.

Referring now to FIG. 1A, the input device 22 generally includes a keypad indicated generally at 102, a display unit 104, a set of control keys indicated generally at 106, and a card reader 108.

The keypad 102 includes a set of numeric keys 110–119 and a pair of transaction type keys including a cash key 120 and a credit key 121. The numeric keys 110–119 and transaction keys 120–121 are used for entering transaction data such as transaction amounts, credit/debit card numbers, customer authorization codes, and indications of whether a particular transaction is a cash or credit transaction via the cash and credit transaction keys 120–121 respectively.

The set 106 control keys includes an enter key 130 for sending enter codes to the microprocessor 24, a debit key 131 for sending a debit code signal indicative that the transaction is a debit card transaction requiring a service bank approval, and a credit key 132 for sending a credit code signal indicative that the transaction is a credit card transaction also requiring a service bank approval.

The display 104 is a liquid crystal display unit capable of displaying various alpha/numeric messages that will be described herein in greater detail.

Considering now the point-of-sale terminal 20A in greater detail with reference to FIG. 1A, the terminal 20A generally comprises a modem 20, microcomputer 22 and input device 24.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of facilitating the collection of sales or use taxes by a bank computer means, comprises:

using a plurality of merchant point-of-sale terminal means by a group of different merchants at different point-of-sale locations, each terminal means including cash and credit/debit card payment means for facilitating the receipt of payment of merchandise;

collecting cash and credit/debit card payments from the sale of merchandise transactions with the merchant terminal means by the group of merchants;

determining sales or use tax information for each individual payment collected by said terminal means at the time of the collection thereof;

accumulating the total of all sales or use tax information for each terminal means during a given short periodic time interval substantially less than quarterly;

storing the accumulated totals of tax information for each terminal means;

sending to merchant computer means from each one of said terminal means a message including the accumulated totals of tax information for a given terminal means, the identification of the merchant terminal means sending the message, and an authorization code to instruct the merchant bank to pay the taxes based on the collected payments from the bank account of the merchant;

receiving the messages and storing them in said merchant computer means from said terminal means for each merchant;

accumulating the stored merchant tax information for the group of merchants; and sending a single tax payment corresponding to the accumulated tax information for the group of merchants to a taxing authority bank and sending a report message including the identification of the merchants making the tax payments corresponding to the single tax payment.

2. A method according to claim 1, further including accessing current accumulated totals of sales taxes from a group of different merchants.

3. A method according to claim 2, further including storing the accumulated merchant tax information indicative of the group accumulated totals.

4. A system for facilitating the collection of sales or use taxes by a bank computer means, comprises:

a plurality of merchant point-of-sale terminal means for a group of different merchants at different point-of-sale locations, each terminal means including cash and credit/debit card payment means for facilitating the receipt of payment of merchandise;

means for collecting cash and credit/debit card payments from the sale of merchandise transactions with the merchant terminal means by the group of merchants;

means for determining sales or use tax information for each individual payment collected by said terminal means at the time of the collection thereof;

means for accumulating the total of all sales or use tax information for each terminal means during a given short periodic time interval substantially less than quarterly;

means for storing the accumulated totals of tax information for each terminal means;

merchant bank computer means;

means for sending to the merchant computer means from each one of said terminal means a message including the accumulated totals of tax information for a given terminal means the identification of the merchant terminal means sending the message, the identity of each one of the applicable taxing authorities, the allocation of the total sum of collected taxes to the individual taxing authorities, and authorization codes to instruct the merchant bank to pay the taxes based on the collected payments from the bank account of the merchant;

means for receiving the messages and storing them in said merchant computer means from said terminal means for each merchant;

means for accumulating the stored merchant tax information for the group of merchants for each applicable taxing authority; and means for sending single tax payments corresponding to the accumulated tax information for the group of merchants to the applicable taxing authority banks and report messages including the identification of the merchants making the tax payments corresponding to the single tax payments for each applicable taxing authority.

5. A system according to claim 4, further includes:

taxing authority computer means for receiving the gathered tax information and collected taxes;

said merchant bank computer means being coupled to selected ones of said plurality of terminal means for supplying said taxing authority computer means with the gathered tax information and collected taxes; and service bank computer means coupled to selected ones of said plurality of terminal means for supplying said taxing authority computer means with taxpayer information and taxes from certain individual members of the general public authorizing the payment of taxes for goods or services supplied by individual ones of said merchants.

6. A system according to claim 5, wherein said terminal means includes:

modem means for communicating gathered tax information to selected ones of said merchant bank computer means;

microcomputer means responsive to input signals for computing required taxes associated with individual sales to members of the general public by at least one of said individual merchants; and input means for generating the input signals, said input signals being indicative of transaction information.

7. A system according to claim 6, wherein said input means includes display means for providing a user with a visual indication of the computer taxes for individual sales.

8. A system according to claim 6, wherein said input means includes keypad means for gathering transaction and tax information.

9. A system according to claim 8, wherein said keypad means includes a group of control keypads for entering control information to help facilitate cash and credit type transactions.

10. System according to claim 4, further including means for gathering cash transaction information.

11. A system according to claim 10, further including means for calculating sales or use tax based on the stored transaction information.

12. A system according to claim 4, further including means for gathering credit/debit card payment information.

13. A system according to claim 12, further including service bank computer means for receiving messages from each one of said terminal means, said messages including accumulated totals of tax information for a given terminal means, the identification of the merchant terminal means sending the message, the identity of each one of the applicable taxing authorities, the allocation of the total sum of collected taxes to the individual taxing authorities; and authorization codes to instruct the merchant bank to pay the taxes based on the collected payments according to the credit/debit accounts of the customers of the merchant.

* * * * *